(12) United States Patent
Kinnear

(10) Patent No.: US 6,869,024 B1
(45) Date of Patent: Mar. 22, 2005

(54) SELF-ADJUSTING MECHANISM FOR A THERMOSTAT RESPONSIVE TO HUMIDITY

(76) Inventor: Duane W. Kinnear, 11770 Ridge Rd., E. Springfield, PA (US) 16411

( * ) Notice: Subject to any disclaimer, the term of this patent is extended or adjusted under 35 U.S.C. 154(b) by 0 days.

(21) Appl. No.: 10/777,709

(22) Filed: Feb. 11, 2004

Related U.S. Application Data

(60) Provisional application No. 60/447,349, filed on Feb. 13, 2003.

(51) Int. Cl.$^7$ ............................................. G05D 23/00
(52) U.S. Cl. ..................... 236/44 C; 236/91 C; 374/22; 337/300
(58) Field of Search ............................ 236/44 C, 44 R, 236/44 A, 44 E, 91 C; 62/176.6; 374/22; 337/300

(56) References Cited

U.S. PATENT DOCUMENTS

| | | | | |
|---|---|---|---|---|
| 1,807,306 A | * | 5/1931 | Colman ...................... 337/300 |
| 2,949,513 A | * | 8/1960 | Davidson ................. 200/61.06 |
| 3,080,465 A | * | 3/1963 | Pelishek ..................... 337/300 |
| 3,859,616 A | * | 1/1975 | Ladany ...................... 337/300 |
| 3,999,706 A | * | 12/1976 | Lewis ....................... 236/44 C |
| 5,732,879 A | * | 3/1998 | Low ......................... 236/44 R |

* cited by examiner

Primary Examiner—Marc Norman
(74) Attorney, Agent, or Firm—Richard K. Thomson

(57) ABSTRACT

A first mounting plate attachable to the wall has a hub on which a second enhanced mounting plate is rotated by a humidity sensing spring to decrease the setting registered by the mercury bulb switch when moist air is present and increase the setting when drier air is present.

7 Claims, 3 Drawing Sheets

SELF-ADJUSTING MECHANISM FOR A THERMOSTAT RESPONSIVE TO HUMIDITY

Priority is hereby claimed of provisional patent application Ser. No. 60/447,349 filed Feb. 13, 2003.

BACKGROUND AND SUMMARY OF THE INVENTION

The present invention is directed to the field of heating, ventilating, and air conditioning (HVAC). More particularly, the present invention is directed to a self-adjusting mechanism for a thermostat which senses humidity and adjusts the temperature within an area based on comfort considerations.

It is well known that the humidity within a room or other space subject to HVAC, is a factor in determining personal comfort within that space. When the humidity is higher, our body's "comfort sensor" tells us it is comfortably warm even if it is actually several degrees cooler than it might be with drier air. Similarly, in the summertime, drier air seems cooler even when several degrees warmer than moist air. This impacts not only our physical comfort, but our heating/cooling costs, as well. If the thermostat recognized a change in humidity which would permit the temperature to be reduced 3–4°, over the course of a heating/cooling season, significant savings could be realized.

The COMFORTSTAT of the present invention comprises a self-adjusting mechanism for a thermostat for modifying its setting as a result of humidity differences to adjust a temperature in a HVAC controlled space and includes a first mounting plate attachable to a wall; a second enhanced mounting plate to which a conventional mercury bulb thermostat is attached, said second mounting plate being mounted for limited rotation relative to said first mounting plate to adjust a relative rotational position of said second mounting plate; means to sense a humidity in the HVAC controlled space and adjust said temperature setting of the thermostat, lower for more humid air and warmer for drier air. The means to sense and adjust comprises a spring, preferably, a composite coil spring which expands and contracts differentially responsive to changes in humidity.

The self-adjusting mechanism includes a hub integrally formed with the first mounting plate, and the spring is coiled thereabout. The hub has a slot which receives a first end of said spring. The second end of said spring is attached to a second enhanced mounting plate which has a thermostat with a conventional mercury bulb mounted thereon, the second mounting plate having a central collar which rotates on the hub. A level is mounted on the first mounting plate to facilitate proper installation of the thermostat adjusting mechanism.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figures 1, 2:
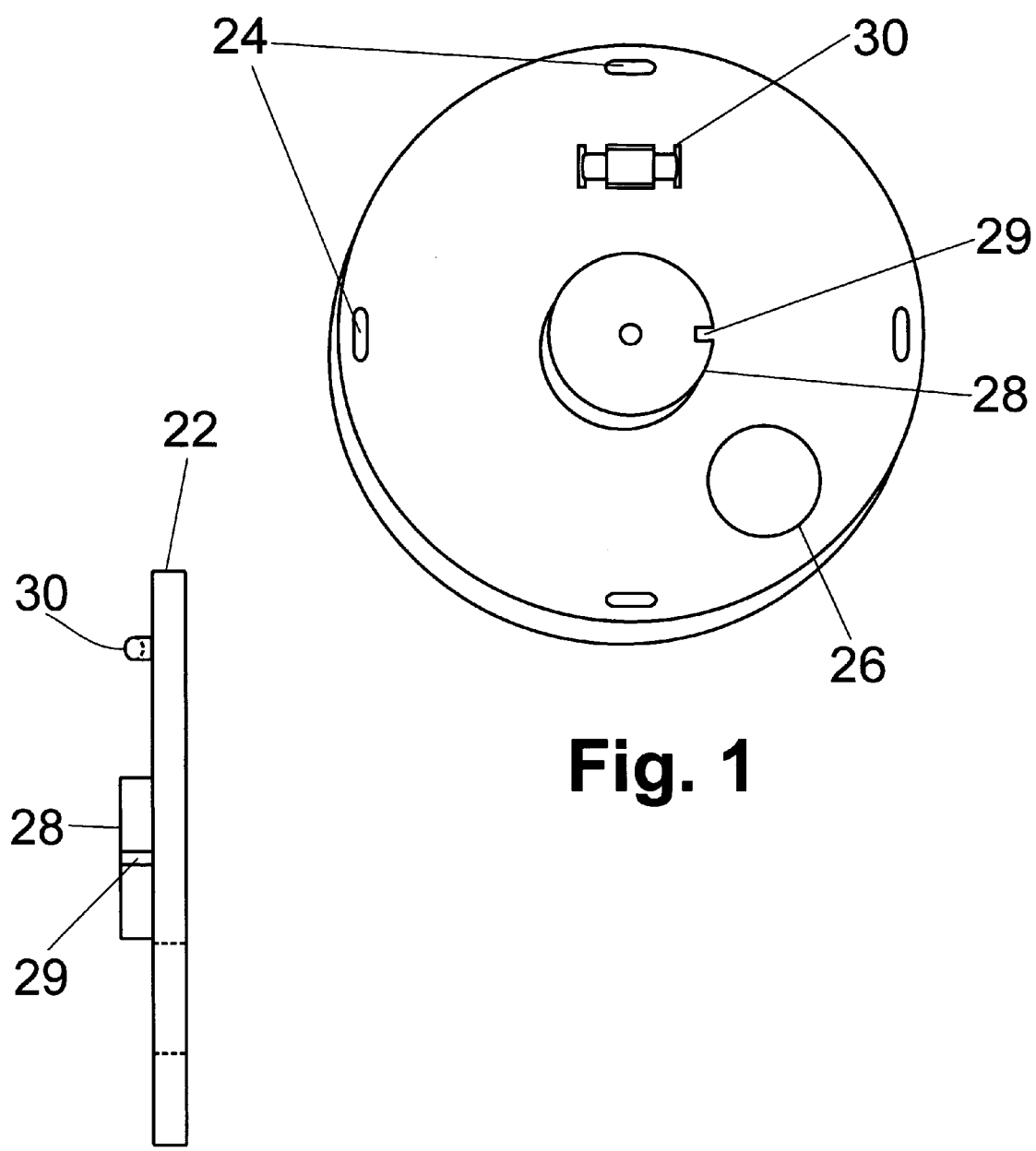
FIG. 1 is a front perspective view of a first embodiment of a first wall mounting plate for the self-adjusting mechanism for use with a thermostat of the present invention.
FIG. 2 is a side view of the first wall mounting plate shown in FIG. 1.
Figure 3:
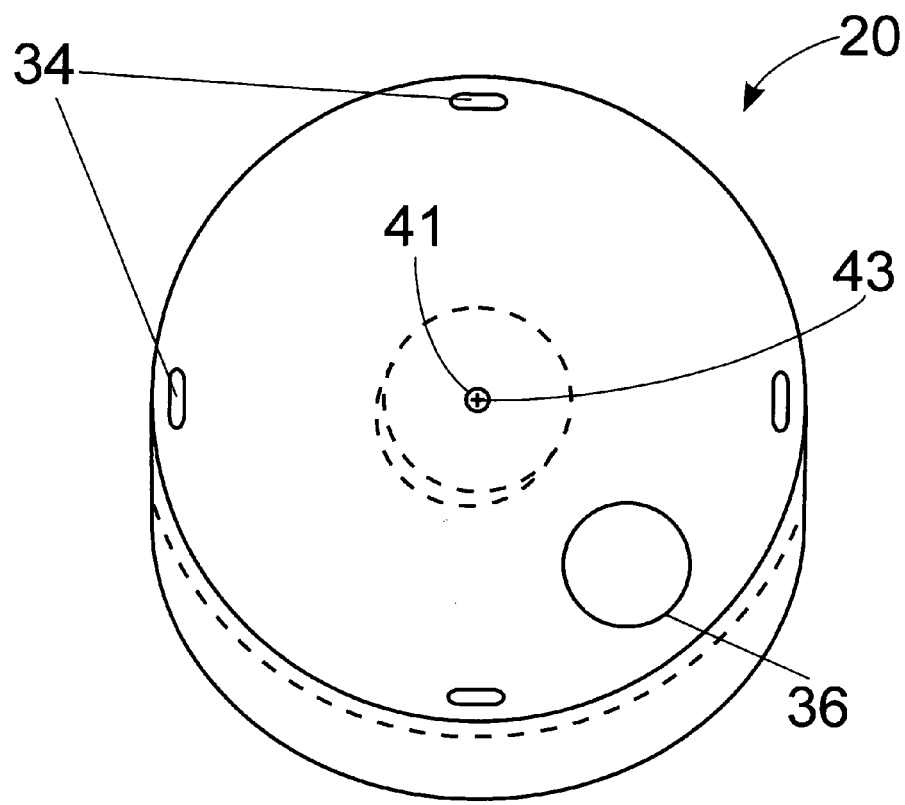
FIG. 3 is a front perspective view of the self-adjusting mechanism with the second enhanced mounting plate in place.
Figure 4:
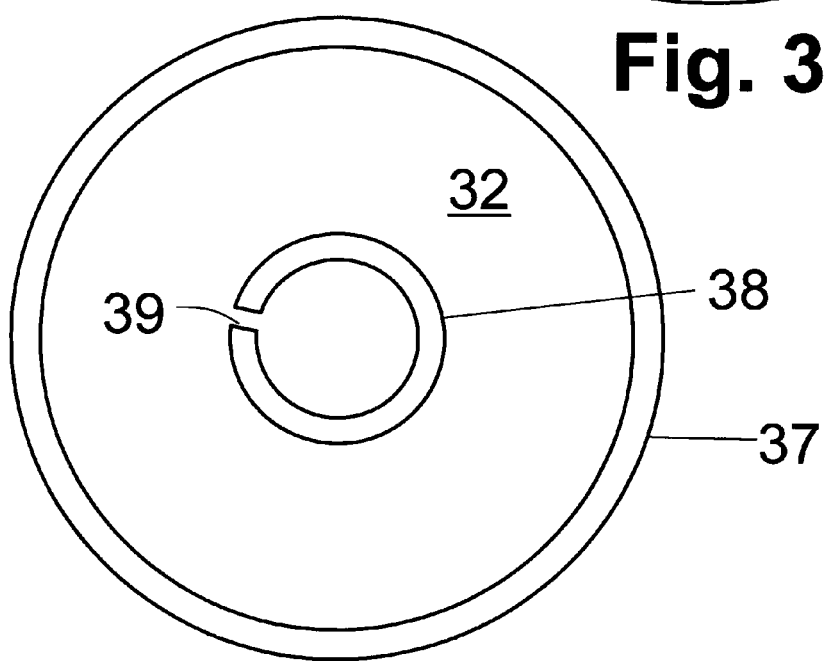
FIG. 4 is a back view of the second enhanced mounting plate.
Figure 5:
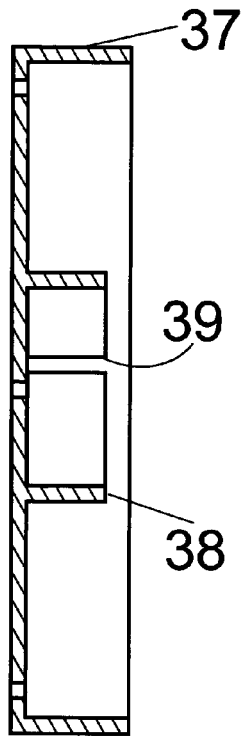
FIG. 5 is a cross-sectional side view of the second enhanced mounting plate.
Figure 6A:
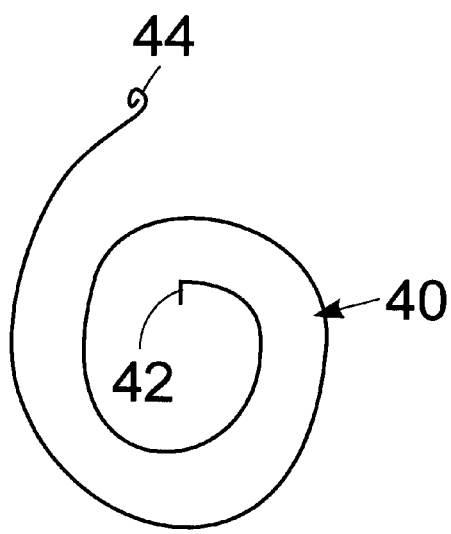
FIG. 6A is a front view of the adjusting spring.
Figure 6B:
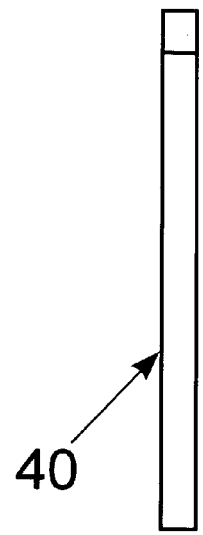
FIG. 6B is a side view of the adjusting spring.

The self-adjusting mechanism of the present invention is shown in FIG. 3 generally at 20. It will be understood that the self-adjusting mechanism 20 of the present invention may be utilized with any conventional thermostat using a mercury bulb switch or its equivalent. The self-adjusting mechanism 20 comprises a first mounting plate 22 (FIGS. 1 and 2) and a second enhanced mounting plate 32. First mounting plate 22 has four slots 24 for securing first mounting plate 22 to a wall over the wires for controlling the HVAC. A large diameter hole 26 is provided to permit the wires to be connected to the thermostat (not shown). A central axle 28 is formed protruding out from the face 27 of first mounting plate 22 with a slot 29 for receiving a first end 42 of spring 40 and an axial threaded hole 31. As best seen in FIGS. 6A and 6B, spring 40 is a bimetallic coil spring which lengthens and shortens responsive to changes in the ambient humidity. First end 42 of spring 40 is received in slot 29, the body of the spring is coiled about axle 28. A level 30 is provided on the front face 27 of first mounting plate 22 to ensure proper positioning of the plate 22 on the wall. Since tilting of the mercury bulbs 60a and 60b (FIG. 7) affects the temperature setting for the HVAC, it is desirable that there be no inadvertent tilting when installing the self-adjusting mechanism 20.

Second enhanced mounting plate 32 has four slots 34 to which a conventional mercury bulb switch thermostat can be fastened. A large diameter hole 36 which is generally aligned with hole 26 is provided to permit the wires to be connected to the thermostat. Second mounting plate 32 has an integral collar 38 with an internal diameter adequate to accommodate axle 28 and spring 40. Collar 38 has a slot 39 which receives second end 44 of spring 40 and a peripheral skirt 37 to enclose the spring 40. A small diameter hole 41 which is aligned with hole 31 in axle 28 to permit a screw 43 to attach second enhanced mounting plate 32 to first mounting plate 22.

Figure 7:
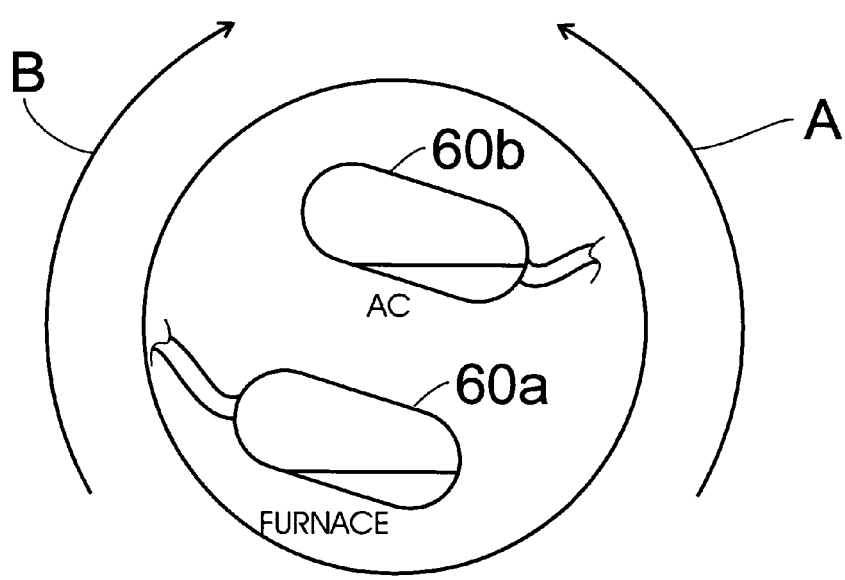
FIG. 7 is a schematic depiction of a mercury bulb switch as used with the self-adjusting mechanism of the present invention.

It will be understood from viewing FIG. 7, that the tilting of mercury bulbs 60a, 60b control the furnace and air conditioning, respectively. Where air conditioning is absent, typically, a thermostat will be installed in which bulb 60b is also lacking. As depicted in FIG. 7, bulb 60b is operational controlling the air conditioner. When dry air is present, spring 40 will cause second mounting plate 32 and the thermostat connected thereto, to be rotated in the direction of arrow A a few degrees resulting in a raising of the temperature by say, 4°. Since our body's internal comfort sensor tells us that dry air is cooler, a setting of 72° will feel like 68°. When the humidity increases, the moist air will result in spring 40 rotating second mounting plate 32 and attached thermostat in the direction of arrow B back toward the actual setting on the thermostat. This is the mode of operation regardless of whether the HVAC is in the heating or cooling mode. Obviously, the use of humidifiers in the winter and de-humidifiers in the summer will enhance the energy savings possible wit the self-adjusting mechanism of the present invention.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A self-adjusting mechanism for a conventional mercury bulb thermostat for modifying a setting thereof as a result of humidity differences to adjust a temperature in a HVAC controlled space, said self-adjusting mechanism comprising
   a) a first cylindrical mounting plate attachable to a wall;
   b) a second enhanced cylindrical mounting plate to which the conventional mercury bulb thermostat is attached, said second enhanced cylindrical mounting plate being mounted for limited rotation relative to said first cylindrical mounting plate to adjust a relative rotational position of said second enhanced cylindrical mounting plate;
   c) means to sense a humidity in the HVAC controlled space and adjust said relative rotational position of said second enhanced cylindrical mounting plate thereby adjusting a temperature setting of the thermostat by tilting the mercury bulb, lowering the temperature for more humid air and increasing the temperature for drier air.

2. The self-adjusting mechanism of claim 1 wherein said means to sense and adjust comprises a spring.

3. The self-adjusting mechanism of claim 2 wherein said spring comprises a composite coil spring which expands and contracts differentially responsive to changes in humidity.

4. The self-adjusting mechanism of claim 3 further comprising a hub integrally formed with said first cylindrical mounting plate, said hub having said spring coiled thereabout.

5. The self-adjusting mechanism of claim 4 wherein said hub has a slot which receives a first end of said spring.

6. The self-adjusting mechanism of claim 5 wherein said second enhanced cylindrical mounting plate further comprises a central collar which rotates on said hub, said second enhanced cylindrical mounting plate supporting the thermostat with a mercury bubble mounted thereon and having a second end of said spring attached thereto.

7. The self-adjusting mechanism of claim 6 further comprising a level mounted on said second enhanced cylindrical mounting plate to facilitate proper installation of said self-adjusting mechanism.

* * * * *